United States Patent [19]

McEnnan

[11] Patent Number: 4,818,037

[45] Date of Patent: Apr. 4, 1989

[54] METHOD FOR ESTIMATING REFERENCE SPEED AND ACCELERATION FOR TRACTION AND ANTI-SKID BRAKING CONTROL

[75] Inventor: James McEnnan, Agoura Hills, Calif.

[73] Assignee: Hughes Aircraft Company, Los Angeles, Calif.

[21] Appl. No.: 194,362

[22] Filed: May 16, 1988

[51] Int. Cl.[4] .................... B60T 8/32; B60T 8/70; B60T 8/80

[52] U.S. Cl. .................................. 303/97; 303/99; 303/103; 303/106; 303/109; 364/426.02

[58] Field of Search .................. 303/91, 94, 95, 96, 303/97, 98, 99, 100, 102, 103, 105, 106, 107, 108, 109, 110; 364/426; 188/181; 180/197

[56] References Cited

U.S. PATENT DOCUMENTS

| | | | |
|---|---|---|---|
| 3,857,613 | 12/1974 | Arikawa | 303/109 |
| 3,934,938 | 1/1976 | Kuwana et al. | 303/109 X |
| 3,953,080 | 4/1976 | Bremer | 303/106 X |
| 3,964,796 | 6/1976 | Bremer | 303/107 |
| 3,985,396 | 10/1976 | Kuwana et al. | 303/105 |
| 4,076,332 | 2/1978 | Taylor et al. | 303/107 X |
| 4,384,330 | 5/1983 | Matsuda et al. | 303/109 X |
| 4,439,832 | 3/1984 | Sato et al. | 303/97 X |
| 4,545,623 | 10/1985 | Sato et al. | 303/92 |
| 4,648,663 | 3/1987 | Nomura et al. | 303/96 X |
| 4,656,588 | 4/1987 | Kubo | 303/92 X |
| 4,665,490 | 5/1987 | Masaki et al. | 303/103 X |

Primary Examiner—Douglas C. Butler
Attorney, Agent, or Firm—S. M. Mitchell; M. J. Meltzer; A. W. Karambelas

[57] ABSTRACT

A method for estimating vehicle reference speed and acceleration utilizing an adaptive filter for providing periodically updated reference values given by a currently extrapolated value plus a correction term which is a function of current wheel slip, wheel acceleration and wheel velocity. The method may be successfully employed over a wide range of road friction coefficients and may be used for traction control as well as anti-skid braking, since the approach does not assure a fixed limiting wheel acceleration. The method avoids the necessity of maintaining low slip values on preselected wheels in order to obtain suitable reference speed values.

18 Claims, 3 Drawing Sheets

METHOD FOR ESTIMATING REFERENCE SPEED AND ACCELERATION FOR TRACTION AND ANTI-SKID BRAKING CONTROL

BACKGROUND OF THE INVENTION

The invention relates generally to traction and anti-skid braking vehicle wheel control systems. More specifically, the invention concerns a method for obtaining an estimate of vehicle reference speed and acceleration suitable for use in determining wheel slip in such systems.

Known anti-skid braking control systems use various mathematical manipulations to estimate the speed of a vehicle for comparison with the rotational speed of a given vehicle wheel to calculate wheel "slip" for that wheel, wheel slip being a parameter needed in order to make decisions concerning wheel lock control.

Due to the interaction between the wheels and the road surface, especially during braking, the actual reference speed of the vehicle itself with respect to the ground is usually different from the speed of a particular wheel. Hence to obtain accurate estimates of vehicle speed, conventional anti-skid braking systems or traction control systems have employed various techniques to simulate a "fifth wheel" which accurately tracks the speed of the vehicle itself. Such known mathematical manipulations typically require averaging or comparison with other wheel speeds to obtain an estimate of the wheel slip at a given single wheel.

Additionally, known systems will not function properly with a non-standard size tire mounted to one of the wheels. This situation is encountered, for example, where a miniaturized spare is being temporarily used after the occurrence of a flat tire. Also, it has been conventionally necessary with prior anti-skid braking systems to disengage the 4-wheel drive option of 4-wheel drive vehicles during anti-skid braking controlled stops in order to obtain a valid reference speed in accordance with the selected mathematical manipulation.

The typical known approaches to mathematically estimating reference speed use averaging procedures and deterministically limit the allowed wheel acceleration to obtain a reference speed from which wheel slip can be estimated or calculated. In effect, such prior approaches typically require some wheel (usually the rear wheels) to be braked at less than maximum torque so that they may be used to estimate the vehicle speed—i.e. the rear wheels are in effect braked at a decreased amount such that they may simulate a "fifth wheel" of the vehicle.

With the advent of mid-engine cars and high performance vehicles, it may no longer be possible to proportionally control the hydraulic system feeding the rear brakes to maintain low slip at the rear wheels such that they may be used for reference vehicle speed estimates and still maintain the high performance of the newer vehicles currently being introduced.

Known approaches to estimating vehicle reference speed are disclosed in the following U.S. Pat. Nos.: 3,934,938-Kuwana et al., 3,953,080-Bremer, 3,964,796-Bremer, 3,985,396-Kuwana et al., 4,545,623-Sato et al., 4,648,663-Nomura et al., 4,656,588-Kubo, 4,665,490-Masaki et al.

SUMMARY OF THE INVENTION

It is an object of the invention to provide a method for estimating vehicle reference speed and acceleration values useable for calculating wheel slip and useable for both anti-skid braking and traction control systems.

A method for estimating a vehicle reference speed and reference acceleration suitable for determining relative wheel slip of an individual wheel of the vehicle includes the steps of periodically determining extrapolated values of reference speed and reference acceleration from previously updated values thereof, estimating the current wheel slip from the extrapolated reference speed, computing adaptive filter gains which are functions of the current estimate of slip and the current estimate of wheel acceleration, generating an error signal as a function of the difference between a current wheel speed and the extrapolated value of the reference speed, and generating updated values of reference speed and reference acceleration by adding to the extrapolated values of reference speed and acceleration a product of the computed filter gains and the error signal.

It is a feature of this invention that the method does not require averaging or comparison with other wheel speeds to obtain an estimate of the wheel slip appropriate to a single wheel.

It is a further feature of the invention that it may be used with non-standard sized tires and cornering situations which could not be accommodated by prior approaches.

It is still a further feature of the invention that it is not necessary to disengage the 4-wheel drive of a 4-wheel drive vehicle during anti-skid braking stops in order to obtain a valid reference speed.

It is yet a further feature of the invention that it requires conventional wheel speed sensor data only and avoids the necessity for accelerometers or other types of sensors.

It is still a further feature of the invention that it may be employed over a wider range of road friction coefficients and may be used for traction control as well as anti-skid braking, since the method embodying the invention does not assume a fixed limiting wheel acceleration.

It is yet a further feature of the invention that braking may be improved through its use, since it is not necessary to maintain low slip values on some wheels in order to obtain a suitable reference speed estimate.

BRIEF DESCRIPTION OF THE DRAWINGS

These and other objects and features of the invention will become apparent from a reading of a detailed description of a preferred embodiment, taken in conjunction with the drawings, in which.

DETAILED DESCRIPTION

Figure 1:
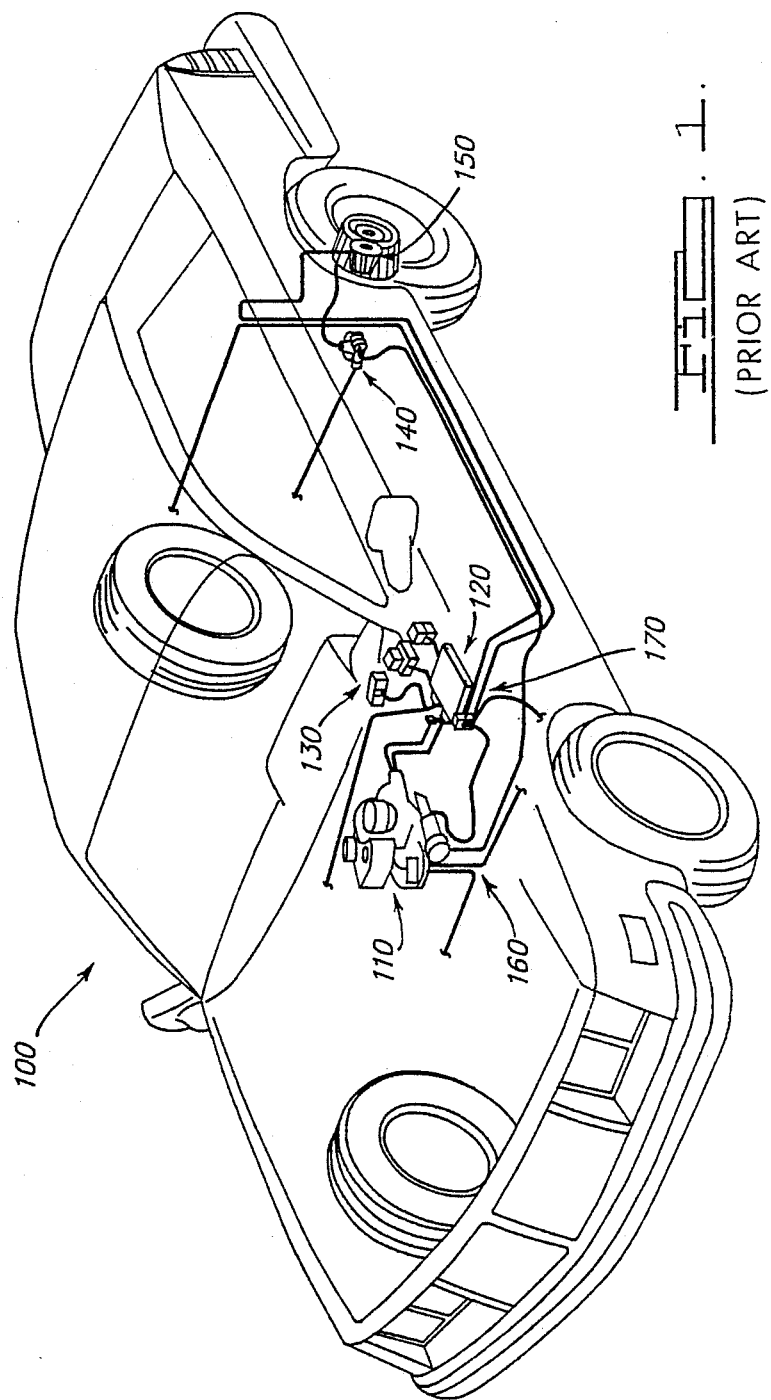
FIG. 1 is a perspective view of a vehicle equipped with major components of a typical anti-lock brake system.

FIG. 1 depicts a perspective view of an automotive vehicle and shows the typical location of major components of an anti-lock brake system. Vehicle 100 includes a hydraulic unit 110 which feeds brakes at the four wheels of the vehicle via brake fluid lines 160. The hydraulic unit is controlled via an electronic controller 120 which utilizes wheel speed sensor data from wheel speed sensors such as 150 coupled via electrical busses 170 to the controller 120. The controller utilizes wheel speed and acceleration data to estimate wheel slip. This estimated data is then utilized by an anti-lock algorithm to issue various commands to the hydraulic unit for modulating brake pressure to the individual vehicle wheels.

In the system shown in FIG. 1, a proportioning valve 140 is shown in the hydraulic feed to the rear wheels. For the method of the disclosed invention, however, this valve may not be necessary, since the speed estimates derived through use of the invention do not require that the rear wheels be maintained at a relatively low value of slip during the braking process as with the prior art.

Relays 130 are used to relay electronic control signals from controller 120 to the various other systems such as hydraulic unit 110.

Figure 2:
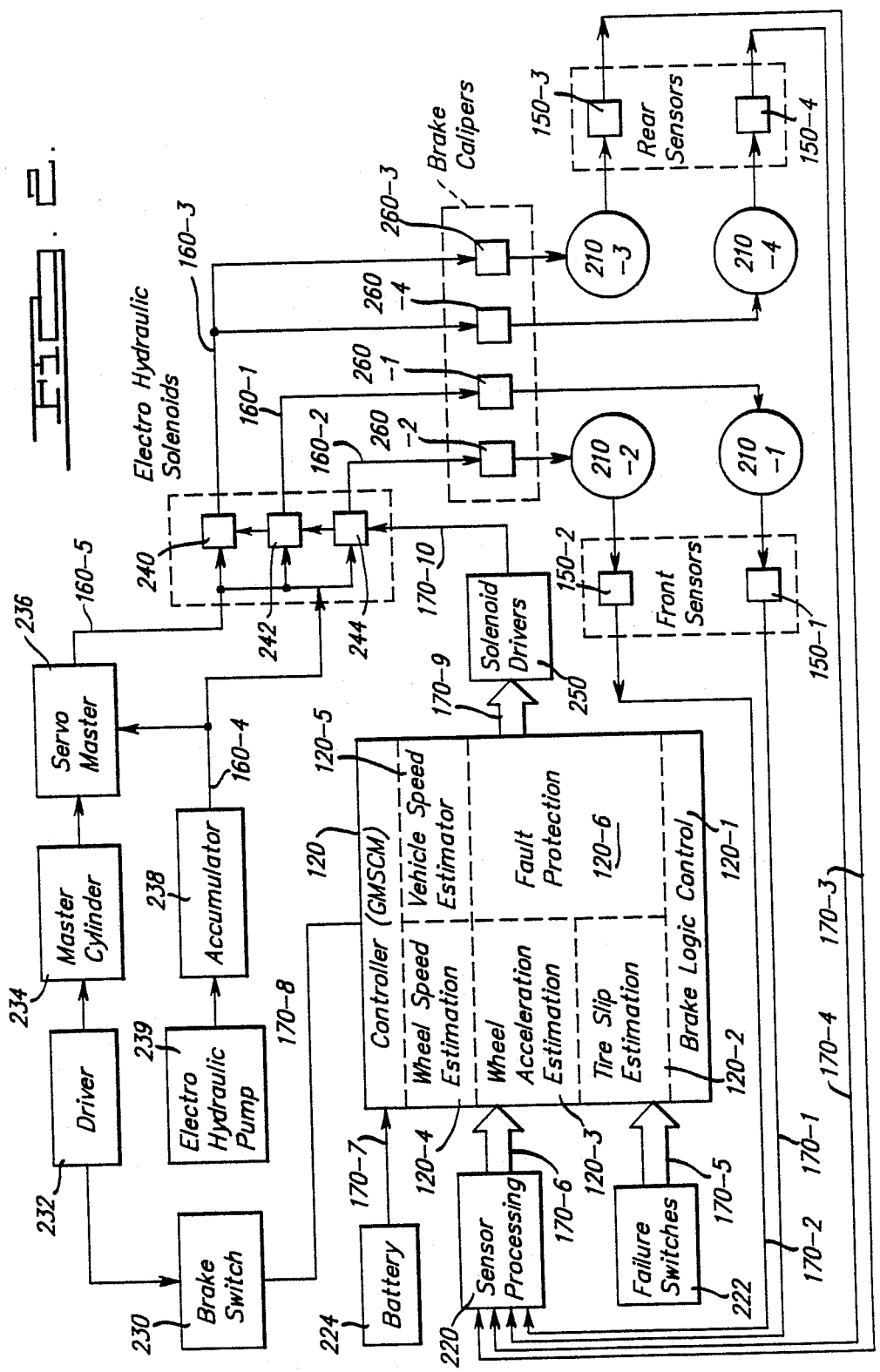
FIG. 2 is a functional block diagram of a typical anti-lock brake system including a controller equipped with the adaptive filters designed in accordance with the principles of the invention.

The functional block diagram of FIG. 2 sets forth in more detail the functional elements of a typical anti-lock system and is used to explain where the adaptive filters used to implement a part of the method of the invention would be located with respect to the overall vehicular control system.

As seen from FIG. 2, wheel speed sensors 150-1, 150-2, 150-3 and 150-4 monitor respectively the rotational speeds of wheel 210-1, 210-2, 210-3 and 210-4. This wheel speed data is coupled via busses 170-1 through 170-4 to sensor processing circuitry 220 which converts the signals to an appropriate level for coupling via bus 170-6 to controller 120. Controller 120 is powered basically by battery system 224 over bus 170-7. Various points in the system may be monitored by scanpoints which feed failure switches 222 whose outputs are coupled via bus 170-5 to controller 120.

Controller 120 includes routines for estimating wheel speed, wheel acceleration, tire slip, and vehicle speed. The various data estimates are utilized by an algorithm resident in controller 120 to implement various brake control commands via brake control logic 120-1. The routines for the data estimation and fault protection are shown in functional block dashed form in controller 120 as tire slip estimation 120-2, wheel acceleration estimation routine 120-3, wheel speed estimation routine 120-4, vehicle speed estimation routine 120-5 and fault protection 120-6. Based upon the algorithm used, brake control logic 120-1 issues various brake pressure modulation control signals via bus 170-9 to solenoid drivers 250. The solenoid drive control signals are coupled via bus 170-10 to electro-hydraulic solenoids such as 240, 242, and 244 which are placed in the hydraulic lines 160 feeding the various brake calibers associated with the vehicle wheels to modulate the brake pressure applied thereto.

The controller algorithm in use also utilizes information concerning the states of the various brakes from the brake switch 230, the information being coupled to the controller 120 via bus 170-8. Brake switch 230 is coupled to a driver 232 which in turn is coupled to a master cylinder 234, then to a servomaster 236 then via hydraulic lines 160-5 to the electro-hydraulic solenoids. An electro-hydraulic pump 239 is coupled to a conventional accumulator 238 which is, in turn, coupled by hydraulic lines 160-4 to servomaster 236 and to the electro-hydraulic solenoids 240, 242, an 244.

Solenoid 240 is coupled between the servomaster 236 and the rear brake calipers 260-3 and 260-4 via hydraulic lines 160-5 and 160-3. Solenoids 242 and 244 are likewise respectively coupled to brake calipers 260-1 and 260-2 which are associated with the front wheels of the vehicle 210-1 and 210-2. The coupling between the solenoids and the front brake calipers is via hydraulic lines 160-1 and 160-2, while the coupling from solenoid 240 passes via hydraulic line 160-3 to both brake calipers 260-3 and 260-4 for the rear wheels.

The invention pertains to a method for generating the gain values for adaptive filters used in estimating the vehicle reference speed and reference acceleration through use of the appropriate routines resident in microcomputer-based controller 120 of FIGS. 1 or 2. The speed and acceleration estimates are used, in turn, for calculating slip at individual vehicle wheels for use by the anti-skid braking or traction control algorithms.

Figure 3:
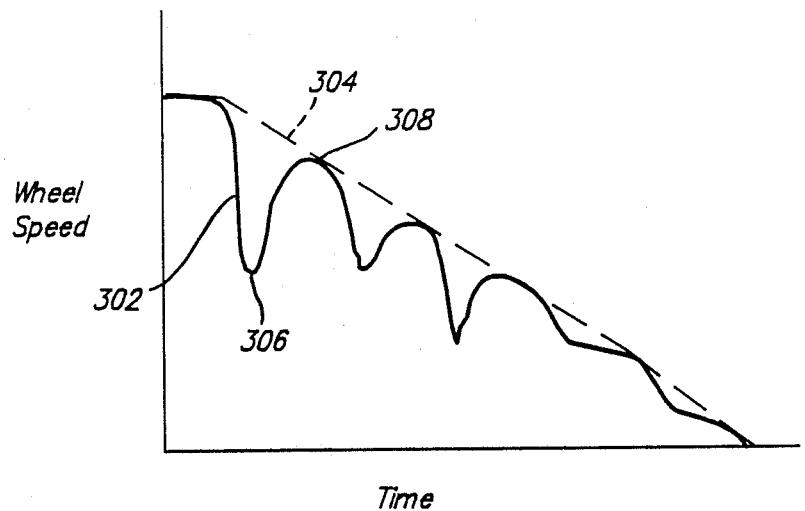
FIG. 3 is a wheel speed versus time graph for a typical anti-skid braking system braking sequence.
Figure 4:
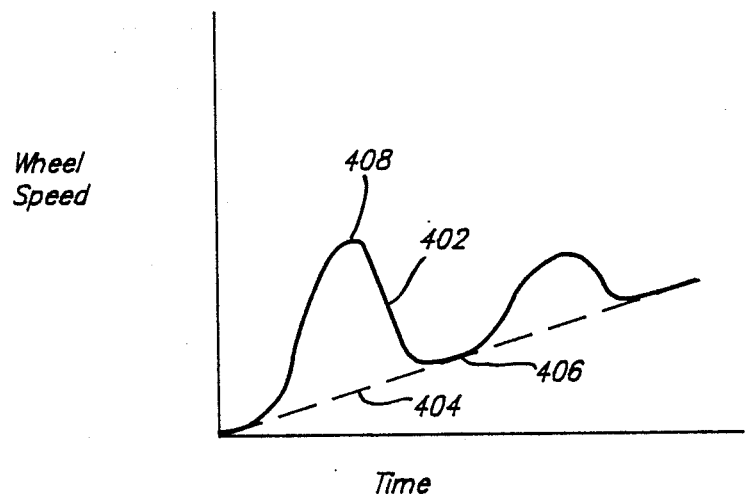
FIG. 4 is a wheel speed versus time graph for a typical traction control system.

FIGS. 3 and 4 show plots of wheel speed versus time for a typical anti-skid brake system and a traction control system, respectively. In each case, the objective is to find a smooth curve which interpolates between periods of high wheel acceleration, the smooth curve being shown in FIGS. 3 and 4 as dashed curves 304 and 404, respectively. The interpolation is to be performed using only current wheel speed and acceleration data to, in effect, form a smooth envelope embracing the peaks 308 of curve 302 of FIG. 3 and the valleys 406 of curve 402 of FIG. 4.

It is assumed that the estimates of the instantaneous wheel speed and acceleration are available using a conventional software implemented linear filter, for example, operating on wheel speed sensor data. The estimated reference speed and acceleration are computed at intervals which depend upon the speed of the microprocessor-based controller 120 of FIGS. 1 and 2, but in any case, less frequently than the wheel speed calculations.

A typical update interval for reference speed and acceleration computation is 10 msec. In oder to determine the current value of the reference speed and acceleration, the following illustrative procedure could be used.

On system reset, or at vehicle stop, the reference speed and acceleration are set to zero. At the end of each update period, the reference speed $v_{ref}$ and acceleration $a_{ref}$ are extrapolated from the previous update interval such that $$v'_{ref} = v_{ref} + (a_{ref})(dt)$$

$$a'_{ref} = a_{ref}$$

where $v'_{ref}$ and $a'_{ref}$ are the extrapolated values of vehicle speed and acceleration, respectively, and where dt is the reference speed update interval. For each wheel, the difference, $e_i$, between the current wheel speed $v_i$ and the extrapolated reference speed is determined by $$e_i = v_i - v'_{ref}$$

Finally, the updated reference speed and acceleration are given by the extrapolated values plus correction terms such that $$v_{ref} = v'_{ref} + K_v(s_i, a_i) * e_i$$

$$a_{ref} = a'_{ref} + K_a(s_i, a_i) * e_i$$

The functions $K_v$ and $K_a$ are the gains of the adaptive filter and are functions of the current estimated wheel slip $s_i$ and wheel acceleration $a_i$.

A definition of wheel slip $s_i$ suitable for traction control as well as anti-skid braking is given in accordance with the following.

First, determine the sign of the reference acceleration in accordance with the following:
If $v'_{ref} = 0$, sign $= +1$
If $a'_{ref} \neq 0$, sign $=$ polarity of previously updated $a_{ref}$
Otherwise, Sign $= -1$
The wheel slip is then given by
If $v_i < v'_{ref}$ and sign $< 0$, $s_i = 1 - v_i/v'_{ref}$
If $v_i > v'_{ref}$ and sign $> 0$, $s_i = 1 - v'_{ref}/v_i$
Otherwise, $s_i = 0$
The relative wheel acceleration $da_i$ is defined by $$da_i = a_i - a'_{ref}$$

Two auxiliary functions $f_1$ and $f_2$ are then computed from the slip and relative wheel acceleration in accordance with the following:
If $s_i < s_0$, $f_1 = 1 - s_i/s_0$
Otherwise, $f_1 = 0$
If $|da_i| < a_0$, $f_2 = 1 - |da_i|/a_0$
Otherwise, $f_2 = 0$
$s_0$ and $a_0$ are positive constant reference slip and acceleration values, respctively, which are selected to give suitable filter performance. Typical values are $s_0 = 0.1$ and $a_0 = 1.2$ g. A typical range for $s_0$ is about 0.08 to about 0.12, while a typical range for $a_0$ is from about 1.0 g to about 1.4 g, where g is the acceleration of gravity. Suitable filter performance means that one may be able to smoothly extrapolate between the speed peaks 308 in FIG. 3 or valleys 406 in FIG. 4.

In terms of the above definitions then, the filter gains $K_v$ and $K_a$ are given by $$K_v(s_i, a_i) = k^0_v + k^1_v(f_1)(f_2)$$

$$K_a(s_i, a_i) = k^0_a + k^1_a(f_1)(f_2)$$

where $k^0_v$, $k^0_a$, $k^1_v$ and $k^1_a$ are constants which are selected to adjust for a desired filter performance. Typical values for $k^0_v$ and $k^0_a$ are in the range from about 0.01 to about 0.07, while typical values for $k^1_v$ and $k^1_a$ are in the range from about 0.2 to about 0.4.

The essential features of the gains $K_v$ and $K_a$ are:
(1) Relatively small, but non-zero values of the gains apply when either the estimated slip or the relative wheel acceleration differs significantly from desired values. By "relatively small" is meant gains yielding a filter time constant of on the order of about 0.5 seconds to about 1.0 seconds.
(2) The gains are relatively large when the estimated slip and relative wheel acceleration are both near their desired values. By "relatively large" is meant gains yielding a filter time constant of on the order of about 0.01 seconds to about 0.05 seconds. However, the gains must be selected so that the filtered time constant is several update periods in order to ensure that the reference speed does not change too rapidly, thereby destroying the smooth nature of the curves 304 and 404 of FIGS. 3 and 4, respectively.
(3) The estimated slip is defined appropriately when the current wheel speed is greater than the reference speed, as well as when it is less than the reference speed, thus enabling use of the method of the invention with either anti-skid braking or traction control.
(4) The values of $s_0$ and $a_0$ may be different for different speed ranges of the vehicle.
(5) The values of $k^0_v$, $k^0_a$, $k^1_v$ and $k^1_a$, as well as $s_0$ and $a_0$ should be chosen to match the wheel dynamics. For example, different values of these constants may be used for front and rear wheels of the vehicle if the braking forces differ significantly from front to rear.

The invention has been described with reference to the details of a preferred embodiment. The details are to be taken for the sake of example only with the scope and spirit of the invention defined in the appended claims.

What is claimed is:

1. A method for estimating a vehicle reference speed and reference acceleration suitable for determining relative wheel slip of an individual wheel of the vehicle, the method comprising:
periodically determining extrapolated values of reference speed and reference acceleration from previously updated values thereof;
estimating a current wheel slip of the individual wheel from the extrapolated value of the reference speed;
computing first and second adaptive filter gains which are functions of a current estimate of slip and a current estimate of wheel acceleration, respectively;
generating an error signal as a function of a difference between current wheel speed and the extrapolated value of the reference speed; and
generating updated values of reference speed and reference acceleration by adding a product of the first gain and the error signal to the extrapolated value of reference speed and by adding a product of the second gain and the error signal to the extrapolated value of reference acceleration.

2. The method of claim 1 wherein the first and second filter gains are relatively small whenever the current estimates of slip and wheel acceleration are outside respective predetermined ranges and relatively large whenever the current estimates of slip and wheel acceleration are within the respective predetermined ranges.

3. The method of claim 2 wherein the extrapolated value of the reference speed equals the previously updated value of the reference speed plus the product of the previously updated value of the reference acceleration and a preselected updating time period.

4. The method of claim 3 wherein the extrapolated value of the reference acceleration equals the previously updated value of the reference acceleration.

5. The method of claim 2 wherein the first gain factor comprises a sum of a first preselected constant with a product of a first function of current estimated wheel slip and a second function of current wheel acceleration.

6. The method of claim 2 wherein the second gain factor comprises a sum of a first preselected constant with a product of a first function of current estimated wheel slip and a second function of current wheel acceleration.

7. The method of claim 5 wherein the first function is proportional to $(1-s_i/s_o)$ for $s_i$ less than $s_o$ and equal to zero otherwise, where $s_i$ is the current estimated wheel slip and $s_o$ is a preselected positive constant reference slip value; and wherein the second function is proportional to $$1-(|a_i-a'_{ref}|)/a_o$$

for $$|a_i-a'_{ref}|$$

less than $a_o$ and equal to zero otherwise, where $a_i$ is the current wheel acceleration, $a'_{ref}$ is the extrapolated value of the reference acceleration, and $a_o$ is a preselected positive constant reference acceleration value.

8. The method of claim 6 wherein the first function is proportional to $(1-s_i/s_o)$ for $s_i$ less than $s_o$ and equal to zero otherwise, where $s_i$ is the current estimated wheel slip and $s_o$ is a preselected positive constant reference slip value; and wherein the second function is proportional to $$1-(|a_i-a'_{ref}|)/a_o$$

for $$|a_i-a'_{ref}|$$

less than $a_o$ and equal to zero otherwise, where $a_i$ is the current wheel acceleration, $a'_{ref}$ is the extrapolated value of the reference acceleration, and $a_o$ is a preselected positive constant reference acceleration value.

9. The method of claim 1 wherein current estimated wheel slip is defined so as to be usable for both traction and anti-skid tracking control.

10. The method of claim 9 wherein the current estimated wheel slip, $s_i$, is determined from an acceleration polarity value, SIGN, the current wheel speed, $v_i$, the extrapolated value of the reference speed, $v'_{ref}$, and the extrapolated value of the reference acceleration, $a'_{ref}$ in accordance with
SIGN = +1, if $v'_{ref} = 0$
SIGN = polarity of previously updated value of reference acceleration, if $a'_{ref} = 0$
SIGN = 0 otherwise;
$s_i = 1 - v_i/v'_{ref}$, if $v_i < v'_{ref}$ and SIGN < 0;
$s_i = 1 - v'_{ref}/v_i$, if $v_i > v'_{ref}$ and SIGN > 0;
$s_i = 0$ otherwise.

11. A method for estimating a vehicle reference speed and reference acceleration suitable for determining wheel slip of an individual wheel of the vehicle, the method comprising:
   (a) initially setting the updated reference speed, $v_{ref}$, and the updated reference acceleration, $a_{ref}$, to zero;
   (b) waiting for a preselected updated time interval dt;
   (c) generating extrapolated values of reference speed, $v'_{ref}$, and reference acceleration, $a'_{ref}$, such that $$v'_{ref} = v_{ref} + (a_{ref})(dt)$$

$$a'_{ref} = a_{ref};$$

(d) calculating a difference, $e_i$, between a current wheel speed, $v_i$, and $v'_{ref}$, or $e_i = v_i - v'_{ref}$;
   (e) determining a polarity function, SIGN, in accordance with the following
   SIGN = +1, if $v'_{ref} = 0$
   SIGN = polarity of $a_{ref}$, if $a'_{ref} \neq 0$
   SIGN = -1, otherwise;
   (f) calculating a current value of wheel slip, $s_i$, in accordance with the following
   $s_i = 1 - v_i/v'_{ref}$, if $v_i < v'_{ref}$ and SIGN < 0, $s_i = 1 - v'_{ref}/v_i$, if $v_i > v'_{ref}$ and SIGN > 0, $s_i = 0$, otherwise;

(g) defining a relative wheel acceleration, $da_i$, by $da_i = a_i - a'_{ref}$, where $a_i$ is current wheel acceleration;
   (h) selecting positive constant reference slip, $s_o$, and positive constant reference acceleration, $a_o$, values;
   (i) calculating two auxiliary functions $f_1$ and $f_2$ in accordance with the following $f_1 = 1 - s_i/s_o$, if $s_i < s_o$, $f_1 = 0$, otherwise, $f_2 = 1 - |da_i|/a_o$ if $|da_i| < a_o$ $f_2 = 0$, otherwise;

(j) calculating two adaptive filter gains, $K_v$ and $K_a$, in accordance with the following $K_v = k^0_v + k^1_v(f_1)(f_2)$ $K_a = k^0_a + k^1_a(f_1)(f_2)$ where $k^0_v$, $k^1_v$, $k^0_a$ and $k^1_a$ are constants selected to obtain a desired filter performance;
   (k) calculating new updated values of reference speed, $v_{ref}$, and reference acceleration, $a_{ref}$, in accordance with the following $v_{ref} = v'_{ref} + K_v e_i$ $a_{ref} = a'_{ref} + K_a e_i$; and (l) returning to step (b).

12. The method of claim 11 wherein typical values for $s_o$ are in the range from about 0.08 to about 0.12.

13. The method of claim 11 wherein $s_o$ is on the order of 0.1.

14. The method of claim 11 wherein typical values for $a_o$ are in the range from about 1.0 g to about 1.4 g, where g is the acceleration of gravity.

15. The method of claim 11 wherein $a_o$ is on the order of 1.2 g, where g is the acceleration of gravity.

16. The method of claim 11 wherein typical values for $k^0_v$ and $k^0_a$ are in the range from about 0.01 to about 0.07.

17. The method of claim 11 wherein typical values for $k^1_v$ and $k^1_a$ are in the range from about 0.2 to about 0.4.

18. The method of claim 11 wherein $a_o$ and $s_o$ are selected from a plurality of values dependent upon a current estimate of vehicle reference speed.

* * * * *